US012113287B2

(12) United States Patent
Yoon et al.

(10) Patent No.: US 12,113,287 B2
(45) **Date of Patent: *Oct. 8, 2024**

(54) ANTENNA STRUCTURE AND IMAGE DISPLAY DEVICE INCLUDING THE SAME

(71) Applicants: DONGWOO FINE-CHEM CO., LTD., Jeollabuk-do (KR); KREEMO INC., Seoul (KR)

(72) Inventors: Ho Dong Yoon, Gyeonggi-do (KR); Young Sub Son, Seoul (KR); Young Su Lee, Gyeonggi-do (KR); In Seok Jang, Gyeonggi-do (KR); Beak Jun Seong, Gyeonggi-do (KR); Jung Woo Lee, Seoul (KR); Seong Tae Jeong, Gyeonggi-do (KR); In Kyung Hong, Seoul (KR); John Joonho Park, Gyeonggi-do (KR)

(73) Assignees: DONGWOO FINE-CHEM CO., LTD., Jeollabuk-do (KR); KREEMO INC., Seoul (KR)

( * ) Notice: Subject to any disclaimer, the term of this patent is extended or adjusted under 35 U.S.C. 154(b) by 122 days.

This patent is subject to a terminal disclaimer.

(21) Appl. No.: 17/857,787

(22) Filed: Jul. 5, 2022

(65) Prior Publication Data

US 2023/0006363 A1 Jan. 5, 2023

(30) Foreign Application Priority Data

Jul. 5, 2021 (KR) ........................ 10-2021-0087564

(51) Int. Cl.
*H01Q 1/36* (2006.01)
*H01Q 1/24* (2006.01)
(Continued)

(52) U.S. Cl.
CPC ............. *H01Q 21/08* (2013.01); *H01Q 1/243* (2013.01); *H01Q 1/36* (2013.01); *H01Q 19/005* (2013.01)

(58) Field of Classification Search
CPC .......... H01Q 1/24; H01Q 1/243; H01Q 5/307; H01Q 5/10; H01Q 5/385; H01Q 5/342;
(Continued)

(56) References Cited

U.S. PATENT DOCUMENTS

2022/0140482 A1* 5/2022 Lee ...................... H05K 1/0243 343/905
2022/0247083 A1* 8/2022 Kim ................... H01Q 21/0075
2022/0263224 A1* 8/2022 Kim ....................... H01Q 5/385

FOREIGN PATENT DOCUMENTS

JP 7-176942 A 7/1995
JP 9-326629 A 12/1997
(Continued)

*Primary Examiner* — Thai Pham
(74) *Attorney, Agent, or Firm* — The PL Law Group, PLLC

(57) ABSTRACT

An antenna structure according to an embodiment of the present disclosure includes a dielectric layer, and a plurality of antenna units arranged on a top surface of the dielectric layer. Each of the plurality of antenna units includes a radiator, a transmission line including a first transmission line and a second transmission line that extend in different directions to be connected to the radiator, an upper parasitic element adjacent to an upper portion of the radiator, and a lower parasitic element adjacent to a lower portion of the radiator and the transmission line. Feeding signals of different phases are applied to the first transmission line and the second transmission line.

18 Claims, 13 Drawing Sheets

(51) Int. Cl.
*H01Q 5/385* (2015.01)
*H01Q 19/00* (2006.01)
*H01Q 21/08* (2006.01)

(58) Field of Classification Search
CPC .......... H01Q 1/36; H01Q 9/04; H01Q 9/0407; H01Q 19/02; H01Q 21/08; H01Q 3/26; H01Q 3/2658
See application file for complete search history.

(56) References Cited

FOREIGN PATENT DOCUMENTS

| | | | |
|---|---|---|---|
| JP | 2019-186966 | A | 10/2019 |
| KR | 10-1962821 | B1 | 7/2019 |
| KR | 10-2019952 | B1 | 9/2019 |
| KR | 10-2070401 | B1 | 1/2020 |

* cited by examiner (a)

(b)

(a)

(b)

ANTENNA STRUCTURE AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2021-0087564 filed on Jul. 5, 2021 in the Korean Intellectual Property Office (KIPO), the entire disclosures of which are incorporated by reference herein.

BACKGROUND

1. Field

The present invention relates to an antenna structure and an image display device including the same. More particularly, the present invention relates to an antenna structure including an antenna conductive layer and a dielectric layer, and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

As mobile communication technologies have been rapidly developed, an antenna capable of operating a high frequency or ultra-high frequency communication is needed in the image display device.

For example, as various functional elements are employed in the image display device, a wide range of a frequency coverage capable of being transmitted and received by an antenna may be needed. Further, if the antenna has a plurality of polarization directions, radiation efficiency may be increased and an antenna coverage may be further increased.

However, as a driving frequency of the antenna increases, signal loss may also be increased. Further, a length of a transmission path increases, an antenna gain may be decreased. If the radiation coverage of the antenna is expanded, a radiation density or the antenna gain may be reduced to degrade radiation efficiency/reliability.

Moreover, design of an antenna that has multi-polarization and broadband properties and provides a high gain may not be easily implemented in a limited space of the image display device.

SUMMARY

According to an aspect of the present invention, there is provided an antenna structure having improved radiation property and spatial efficiency.

According to an aspect of the present invention, there is provided an image display device including an antenna structure with improved radiation property and spatial efficiency.

(1) An antenna structure, including: a dielectric layer; and a plurality of antenna units arranged on a top surface of the dielectric layer, wherein each of the plurality of antenna units includes: a radiator; a transmission line including a first transmission line and a second transmission line that extend in different directions to be connected to the radiator; an upper parasitic element adjacent to an upper portion of the radiator; and a lower parasitic element adjacent to a lower portion of the radiator and the transmission line, wherein feeding signals of different phases are applied to the first transmission line and the second transmission line.

(2) The antenna structure of the above (1), wherein a phase difference between the feeding signals applied to the first transmission line and the second transmission line is from 120° to 180°.

(3) The antenna structure of the above (1), wherein at least a portion of an antenna unit of the plurality of antenna units is shared with another neighboring antenna unit.

(4) The antenna structure of the above (3), wherein the antenna unit and the neighboring antenna unit share a portion of the lower parasitic element with each other.

(5) The antenna structure of the above (1), wherein the plurality of antenna units are arranged to be spaced apart from each other.

(6) The antenna structure of the above (1), wherein the radiator includes convex portions and concave portions, and the first transmission line and the second transmission line are connected to different concave portions among the concave portions.

(7) The antenna structure of the above (1), wherein the first transmission line includes: a first feeding portion; and a first bent portion extending from the first feeding portion to be connected to the radiator, wherein the second transmission line includes: a second feeding portion; and a second bent portion extending from the second feeding portion to be connected to the radiator.

(8) The antenna structure of the above (1), wherein the upper parasitic element includes a first upper parasitic element and a second upper parasitic element separated from each other.

(9) The antenna structure of the above (8), the radiator includes convex portions and concave portions, and the first upper parasitic element and the second upper parasitic element are disposed to be adjacent to different concave portions of the concave portions.

(10) The antenna structure of the above (9), wherein the first upper parasitic element and the second upper parasitic element face each other with a convex portion located at an upper portion of the radiator among the convex portions interposed therebetween.

(11) The antenna structure of the above (1), wherein the lower parasitic element includes: a first side parasitic element adjacent to the first transmission line; and a second side parasitic element adjacent to the second transmission line.

(12) The antenna structure of the above (11), wherein the lower parasitic element further includes a central parasitic element disposed between the first transmission line and the second transmission line, and the first side parasitic element is separated from the central parasitic element with the first transmission line interposed therebetween, and the second side parasitic element is separated from the central parasitic element with the second transmission line interposed therebetween.

(13) The antenna structure of the above (12), wherein the first side parasitic element includes: a first parasitic body facing the central parasitic element with the first transmission line interposed therebetween; a first parasitic extension protruding from the first parasitic body; and a first parasitic branched portion extending from the first parasitic extension toward the radiator, wherein the second side parasitic element includes: a second parasitic body facing the central parasitic element with the second transmission line interposed therebetween; a second parasitic extension protruding from the second parasitic body; and a second parasitic branched portion extending from the second parasitic extension toward the radiator.

(14) The antenna structure of the above (13), wherein the radiator has a mesh structure, and the central parasitic element, the first parasitic body, and the second parasitic body have a solid structure.

(15) The antenna structure of the above (14), wherein a portion of the first transmission line between the central parasitic element and the first parasitic body has a solid structure, and a remaining portion of the first transmission line has a mesh structure, and a portion of the second transmission line between the central parasitic element and the second parasitic body has a solid structure, and a remaining portion of the second transmission line has a mesh structure.

(16) The antenna structure of the above (13), wherein the radiator has a mesh structure, and each of the central parasitic element, the first parasitic body and the second parasitic body includes a mesh portion and a solid portion.

(17) The antenna structure of the above (1), wherein the radiator has a four-leaf clover shape or a cross shape.

(18) An image display device including the antenna structure according to embodiments as described above.

According to embodiments of the present invention, an antenna structure may include a plurality of antenna units, each of which may include a radiator including a plurality of convex portions and concave portions. The antenna structure may include a plurality of transmission lines connected to the radiator in different directions. A plurality of polarization directions and a coverage of a plurality of frequencies may be substantially provided by the combination of the radiator and the transmission line.

In exemplary embodiments, feeding signals of the same phase difference may be applied to each antenna unit to implement a triple-band antenna.

In exemplary embodiments, a plurality of parasitic elements may be arranged around the radiator and the transmission line. A formation of the plurality of resonance frequencies may be promoted by the parasitic elements, so that a substantially effective triple-band antenna may be implemented.

DETAILED DESCRIPTION OF THE EMBODIMENTS

According to exemplary embodiments of the present invention, an antenna structure in which a radiator and a parasitic element are combined to have a plurality of frequencies and a multi-polarization property is provided.

The antenna structure may be, e.g., a microstrip patch antenna fabricated in the form of a transparent film. The antenna device may be applied to communication devices for a mobile communication of a high or ultrahigh frequency band corresponding to a mobile communication of, e.g., 3G, 4G, 5G or more.

According to exemplary embodiments of the present invention, an image display device including the antenna structure is also provided.

The image display device may be implemented in the form of various electronic devices such as a smart phone, a tablet, a laptop computer, a wearable device, a digital camera, etc.

An application of the antenna structure is not limited to the image display device, and the antenna structure may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

In the accompanying drawings, two directions parallel to a top surface of a dielectric layer and perpendicular to each other are defined as an x-direction and a y-direction. A direction vertical to the top surface of the dielectric layer is defined as a z-direction. For example, the x-direction may correspond to a length direction of the antenna structure, the y-direction may correspond to a width direction of the antenna structure, and the z-direction may correspond to a thickness direction of the antenna structure.

Figure 1:
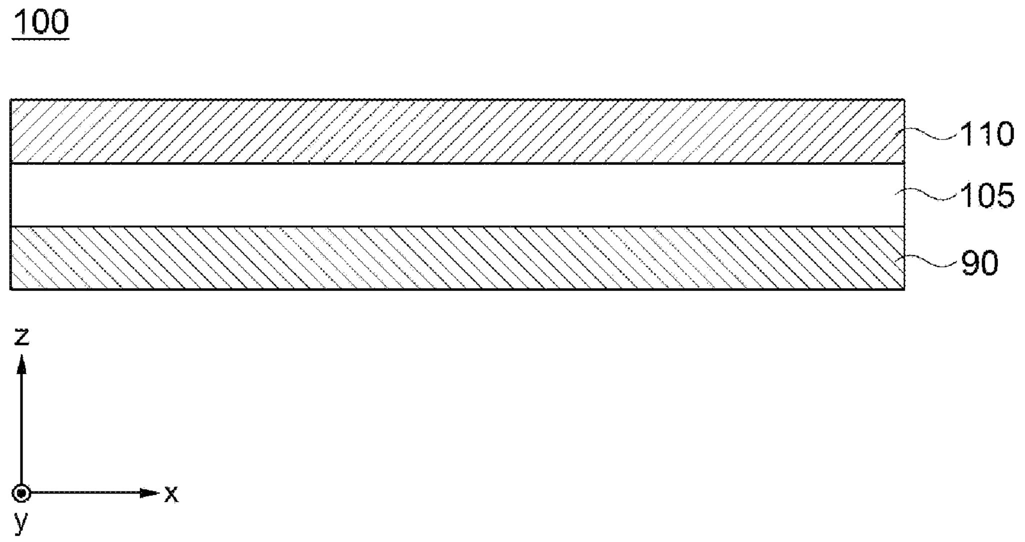
FIG. 1 is a schematic cross-sectional view illustrating an antenna structure in accordance with exemplary embodiments.

FIG. 1 is a schematic cross-sectional view illustrating an antenna structure in accordance with exemplary embodiments.

Referring to FIG. 1, an antenna structure 100 according to exemplary embodiments may include a dielectric layer 105 and an antenna conductive layer 110.

The dielectric layer 105 may serve as a film substrate of the antenna structure 100 on which the antenna conductive layer 110 is formed.

The dielectric layer 105 may include, e.g., a transparent resin material. For example, the dielectric layer 105 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

The dielectric layer 105 may include an adhesive material such as an optically clear adhesive (OCA), an optically clear resin (OCR), or the like. In some embodiments, the dielectric layer 105 may include an inorganic insulating material such as glass, silicon oxide, silicon nitride, silicon oxynitride, etc.

In an embodiment, the dielectric layer 105 may be provided as a substantially single layer. In an embodiment, the dielectric layer 105 may include a multi-layered structure of at least two layers.

Capacitance or inductance may be formed in the dielectric layer 105, so that a frequency band at which the antenna structure may be driven or operated may be adjusted. In some embodiments, a dielectric constant of the dielectric layer 105 may be adjusted in a range from about 1.5 to about 12, preferably from 2 to 12. If the dielectric constant exceeds about 12, a driving frequency may be excessively decreased, and driving in a desired high frequency or ultrahigh frequency band may not be implemented.

In exemplary embodiments, an insulating layer (e.g., an encapsulation layer of a display panel, a passivation layer, etc.) at an inside of an image display device to which the antenna structure 100 is applied may serve as the dielectric layer 105.

The antenna conductive layer 110 may be disposed on a top surface of the dielectric layer 105.

The antenna conductive layer 110 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in a combination of at least two therefrom.

For example, the antenna conductive layer 110 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna conductive layer 110 may include a transparent conductive oxide such as indium tin oxide (ITO), indium zinc oxide (IZO), indium zinc tin oxide (ITZO), zinc oxide (ZnOx), etc.

In some embodiments, the antenna conductive layer 110 may include a stacked structure of a transparent conductive oxide layer and a metal layer. For example, the antenna unit may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In an embodiment, the antenna conductive layer 110 may include a metamaterial.

In some embodiments, the antenna conductive layer 110 (e.g., the radiator 120) may include a blackened portion, so that a reflectance at a surface of the antenna conductive layer 110 may be decreased to suppress a visual pattern recognition due to a light reflectance.

In an embodiment, a surface of the metal layer included in the antenna conductive layer 110 may be converted into a metal oxide or a metal sulfide to form a blackened layer. In an embodiment, a blackened layer such as a black material coating layer or a plating layer may be formed on the antenna conductive layer 110 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In exemplary embodiments, the antenna structure 100 may further include a ground layer 90. A vertical radiation property may be implemented by the inclusion of the ground layer 90.

The ground layer 90 may be disposed on a bottom surface of the dielectric layer 105. The ground layer 90 may overlap the antenna conductive layer 110 with the dielectric layer 105 interposed therebetween. For example, the radiator 120 may be superimposed over the ground layer 90.

In an embodiment, a conductive member of the image display device or a display panel to which the antenna structure 100 is applied may serve as the ground layer 90. For example, the conductive member may include various electrodes or wirings such as, e.g., a gate electrode, a source/drain electrode, a pixel electrode, a common electrode, a scan line, a data line, etc., included in a thin film transistor (TFT) array panel.

In an embodiment, a metallic member disposed at a rear portion of the image display device such as a SUS plate, a sensor member (e.g., a digitizer), a heat dissipation sheet, etc., may serve as the ground layer 90.

Figure 2:
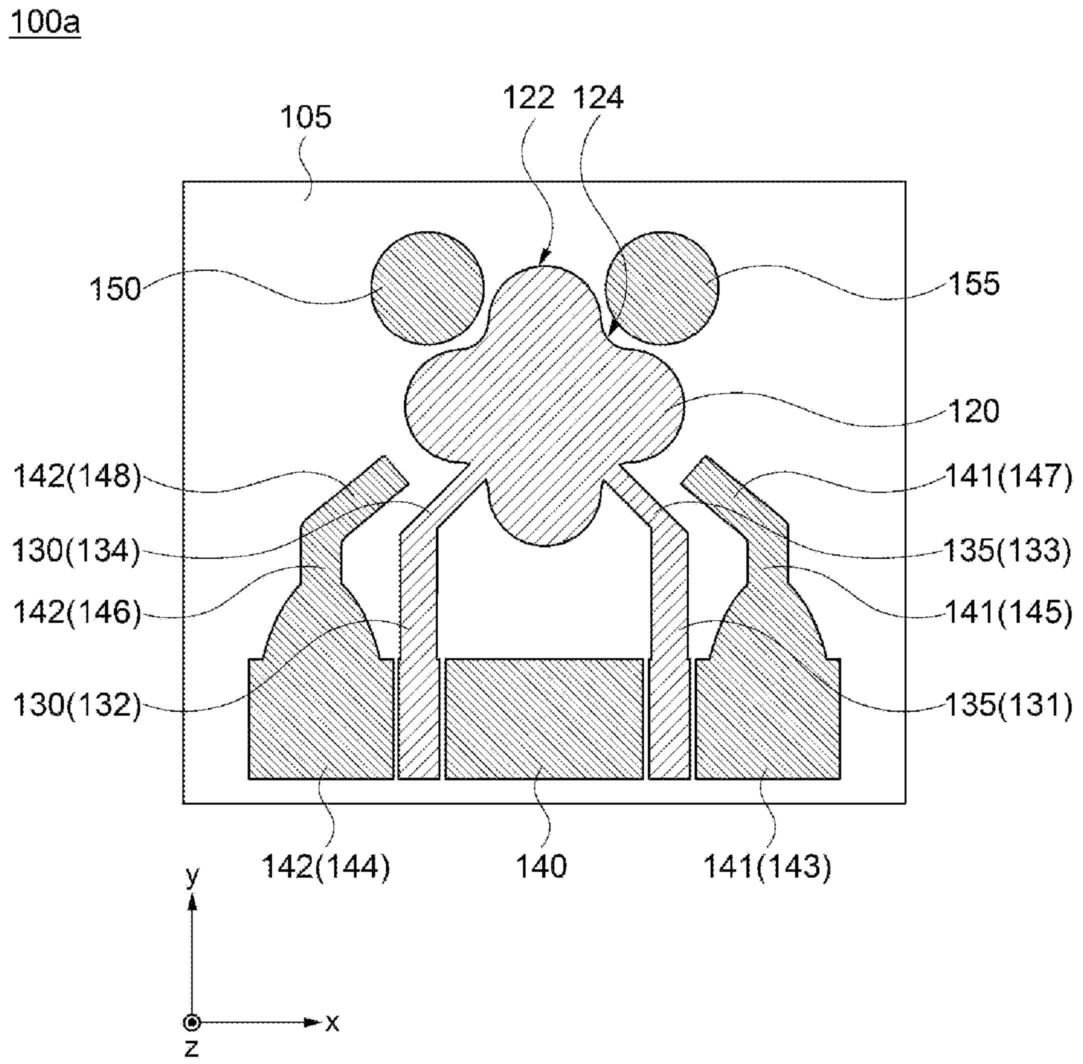
FIG. 2 is a schematic plan view illustrating an antenna structure in accordance with exemplary embodiments.

FIG. 2 is a schematic plan view illustrating an antenna structure in accordance with exemplary embodiments.

Referring to FIG. 2, the antenna structure 100*a* may include the antenna electrode layer 110 disposed on the dielectric layer 105 as described with reference to FIG. 1. The antenna conductive layer 110 may include a radiator 120, a transmission line 130 and 135, and a parasitic element 140, 141, 142, 150 and 155.

In exemplary embodiments, the radiator 120 or a boundary of the radiator 120 may include a plurality of convex portions 122 and concave portions 124. As illustrated in FIG. 2, each of the convex portions 122 and the concave portions 124 may have a curved shape.

In exemplary embodiments, the convex portions 122 and the concave portions 124 may be alternately and repeatedly arranged along a profile of the radiator 120 in a plan view. For example, four convex portions 122 and four concave portions 124 may be alternately and repeatedly arranged along the profile of the radiator 120.

As illustrated in FIG. 2, the radiator 120 may have a curved cross shape. For example, the radiator 120 may have a substantially four-leaf clover shape.

In exemplary embodiments, a plurality of the transmission lines 130 and 135 may be connected to one radiator 120. For example, a first transmission line 130 and a second transmission line 135 may be connected to the radiator 120.

In exemplary embodiments, the transmission lines 130 and 135 may include the same conductive material as that of the radiator. In an embodiment, the transmission lines 130 and 135 may serve as a substantially unitary integral member connected with the radiator 120. In an embodiment, the transmission lines 130 and 135 may be formed individually from the radiator 120.

The first transmission line 130 and the second transmission line 135 may be arranged symmetrically with each other. For example, the first transmission line 130 and the second transmission line 135 may be disposed to be symmetrical to each other based on a central line of the radiator 120 in the y-direction.

Each of the transmission lines may include a feeding portion and a bent portion. The first transmission line 130 may include a first feeding portion 132 and a first bent portion 134, and the second transmission line 135 may include a second feeding portion 131 and a second bent portion 133.

Figure 10:
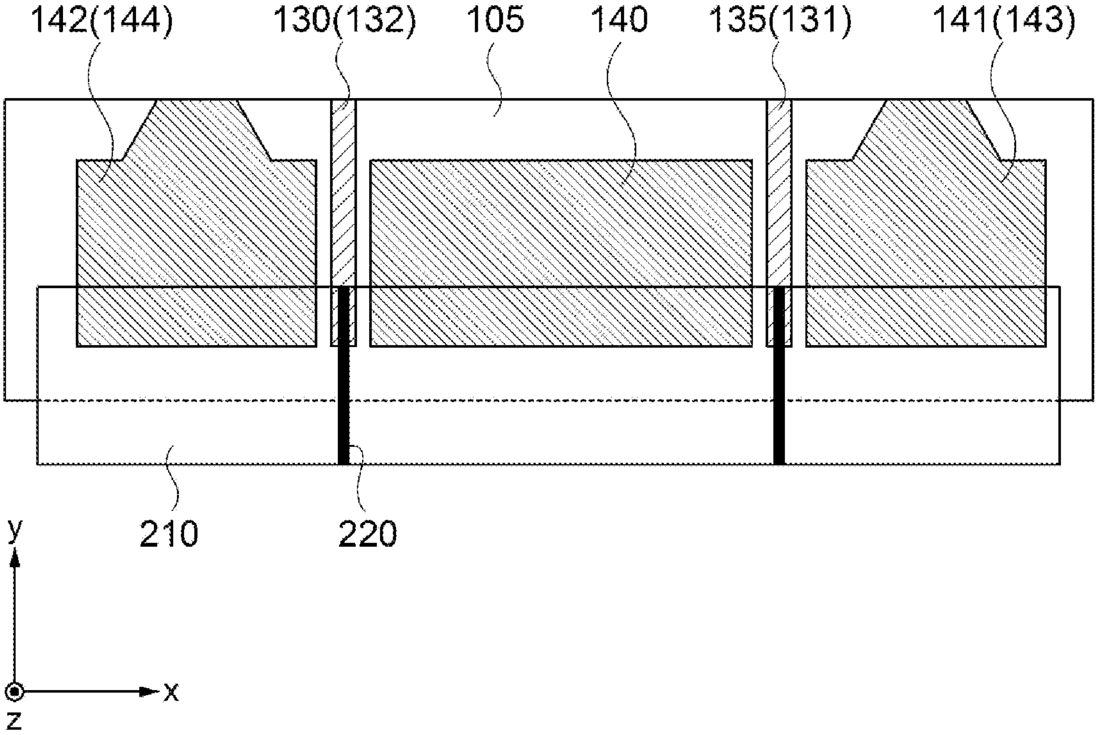
FIG. 10 is a schematic partially enlarged plan view for describing an antenna package in accordance with exemplary embodiments.

Each of the first feeding portion 132 and the second feeding portion 131 may be electrically connected to a feeding line included in a circuit board such as, e.g., a flexible printed circuit board (FPCB) (see FIG. 10). In some embodiments, the first feeding portion 132 and the second feeding portion 131 may extend in the y-direction. The first feeding portion 132 and the second feeding portion 131 may be substantially parallel to each other.

The first bent portion 134 and the second bent portion 133 may be bent in directions toward the radiator 120 from the first feeding portion 132 and the second feeding portion 131, respectively, and may be directly connected to or in a direct contact with the radiator 120.

The first bent portion 134 and the second bent portion 133 may extend in different directions from each other to be connected to the radiator 120. In exemplary embodiments, an angle between extending directions of the first bent portion 134 and the second bent portion 133 may be substantially about 90°.

For example, the first bent portion 134 may be inclined by 45° in a clockwise direction with respect to the y-direction. The second bent portion 133 may be inclined by 45° in a counterclockwise direction with respect to the y-direction.

Preferably, the first bent portion 134 and the second bent portion 133 may each extend toward a center of the radiator 120.

According to the structure and arrangement of the bent portions 133 and 134 as described above, feeding may be performed in substantially two orthogonal directions to the radiator 120 through the first transmission line 130 and the second transmission line 135. Accordingly, a dual polarization property may be implemented from one radiator 120.

In some embodiments, the bent portions 133 and 134 may be connected to the concave portions 124 of the radiator 120. As illustrated in FIG. 2, the first bent portion 134 and the second bent portion 133 may be connected to different concave portions 124.

In an embodiment, the first bent portion 134 and the second bent portion 133 may be connected to lower concave portions 124 of four concave portions with respect to a central line extending in the x-direction of the radiator 122 in a plan view. The term "lower" herein may refer to a portion or a region adjacent to the feeding portions 131 and 132 with respect to the central line extending in the x-direction of the radiator 122.

In exemplary embodiments, the antenna structure 100*a* may include the parasitic elements 140, 141, 142, 150 and 155 physically and electrically separated from the radiator 120 and the transmission lines 130 and 135.

The parasitic elements may include lower parasitic elements 140, 141 and 142 adjacent to the transmission lines 130 and 135 and upper parasitic elements 150 and 155 adjacent to the radiator 120.

The lower parasitic elements 140, 141 and 142 may be located below the central line extending in the x-direction of the radiator 122 to be disposed around the transmission lines 130 and 135. The lower parasitic elements 140, 141 and 142 may include a central parasitic element 140, a first side parasitic element 142 and a second side parasitic element 141. In an embodiment, the central parasitic element 140 may be omitted.

The central parasitic element 140 may be interposed between the first transmission line 130 and the second transmission line 135. In an embodiment, the central parasitic element 140 may be interposed between the first feeding portion 132 and the second feeding portion 131.

The first side parasitic element 142 and the second side parasitic element 141 may be adjacent to both lateral sides of the central parasitic element 140. The first side parasitic element 142 may include a first parasitic body 144, a first parasitic extension 146 and a first parasitic branched portion 148. The second side parasitic element 141 may include a second parasitic body 143, a second parasitic extension 145 and a second parasitic branched portion 147.

The first parasitic body 144 may face the central parasitic element 140 with the first transmission line 130 interposed therebetween. The second parasitic body 143 may face the central parasitic element 140 with the second transmission line 135 interposed therebetween.

The first parasitic extension 146 and the second parasitic extension 145 may protrude and extend from the first parasitic body 144 and the second parasitic body 143, respectively. The first parasitic extension 146 and the second parasitic extension 145 may extend in the y-direction.

The first parasitic branched portion 148 and the second parasitic branched portion 147 may extend from end portions of the first parasitic extension 146 and the second parasitic extension 145, respectively, toward the radiator 120. In an embodiment, the first parasitic branched portion 148 and the second parasitic branched portion 147 may be substantially parallel to the first bent portion 134 and the second bent portion 133, respectively.

The upper parasitic elements 150 and 155 may be disposed at an upper region based on the central line of the radiator 120 in the x-direction. The term "upper" may refer to a portion or a region that is away from the feeding portions 131 and 132 or opposite to the feeding portions 131 and 132 with respect to the central line extending in the x-direction of the radiator 120 in the plan view.

The upper parasitic elements 150 and 155 may be adjacent to the radiator 120. The upper parasitic elements 150 and 155 may be physically separated from the radiator 120. In exemplary embodiments, the upper parasitic elements 150 and 155 may be adjacent to the concave portions 124 included in an upper portion of the radiator 120. For example, the upper parasitic elements 150 and 155 may be partially disposed in recesses formed by the concave portions 124.

The upper parasitic elements 150 and 155 may include a first upper parasitic element 150 and a second upper parasitic element 155. The first upper parasitic element 150 and the second upper parasitic element 155 may be disposed to be adjacent to different concave portions 124 of the radiator 120.

In exemplary embodiments, the first upper parasitic element 150 and the second upper parasitic element 155 may be disposed to face each other with the convex portion 122 included in the upper portion of the radiator 120 interposed therebetween.

In an embodiment, the first upper parasitic element 150 and the second upper parasitic element 155 may have a substantially circular shape. However, the first upper parasitic element 150 and the second upper parasitic element 155 may be modified into a proper shape (e.g., an elliptical shape or a polygonal shape) according to the shape of the radiator 120.

In exemplary embodiments, the radiator 120, the transmission lines 130 and 135, and the parasitic elements 140, 141, 142, 150 and 155 may all be disposed at the same level or at the same layer on the top surface of the dielectric layer 105. For example, the radiator 120, the transmission lines 130 and 135, and the parasitic elements 140, 141, 142, 150 and 155 may all be formed by patterning the same conductive layer.

According to the above-described exemplary embodiments, the radiator 120 may be formed to include the convex portion 122 and the concave portion 124, and the first and second transmission lines 130 and 135 may be connected to different concave portions 124 of the radiator 120 in intersecting directions. The dual polarization property may be implemented from the radiator 120 by the above-described dual transmission line structure.

In some embodiments, feeding signals having different phases may be applied to the first and second transmission lines 130 and 135. For example, a first feeding signal and a second feeding signal having a phase difference from about 120° to 200°, preferably from 120° to 180°, more preferably about 180° may be applied to the first and second transmission lines 130 and 135, respectively.

The antenna structure 100*a* may be provided as a broadband antenna operable in a multi-resonance frequency band by the combination of the phase difference signaling, the dual transmission line structure and the shape of the radiator 120.

The parasitic elements 140, 141, 142, 150 and 155 may be provided in a floating pattern separated from other conductors, and may be adjacent to the radiator 120 to enhance a band formation of each resonance frequency in the multi-resonance frequencies implemented by the antenna structure 100*a*.

Different resonance frequency bands may be distinguished by the above-described parasitic elements 140, 141, 142, 150 and 155, so that the antenna structure 100*a* may be provided as a substantially multi-band antenna. Further, the lower parasitic elements 140, 141 and 142 may be disposed around the transmission lines 130 and 135, and the upper parasitic elements 150 and 155 may be adjacent to the upper portion of the radiator 120, so that signal enhancement and multi-band formation may be uniformly implemented in low-frequency and high-frequency bands, and an antenna gain may be improved.

In some embodiments, the antenna structure 100*a* may serve as a triple band antenna. For example, three resonance frequency peaks in a range from 10 GHz to 40 GHz or from 20 GHz to 40 GHz may be provided from the antenna structure 100*a*.

In an embodiment, a first resonance frequency peak in a range of 20 GHz to 25 GHz, a second resonance frequency peak in a range of 27 GHz to 35 GHz, and a third resonance frequency peak in a range of 35 GHz to 40 GHz may be implemented from the antenna structure 100.

Figure 3:
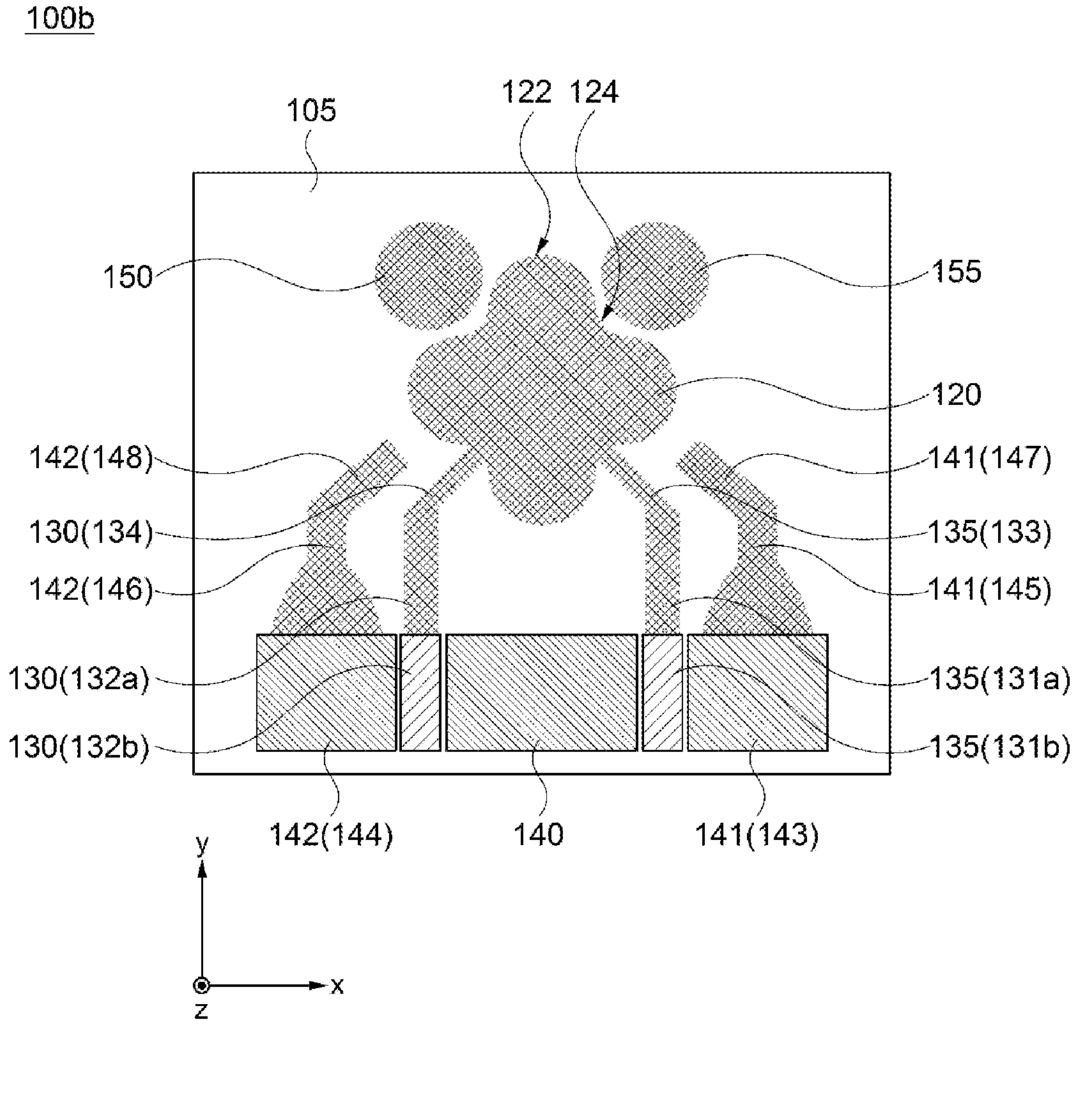
FIGS. 3 and 4 are schematic plan views illustrating antenna structures in accordance with exemplary embodiments.
Figure 4:
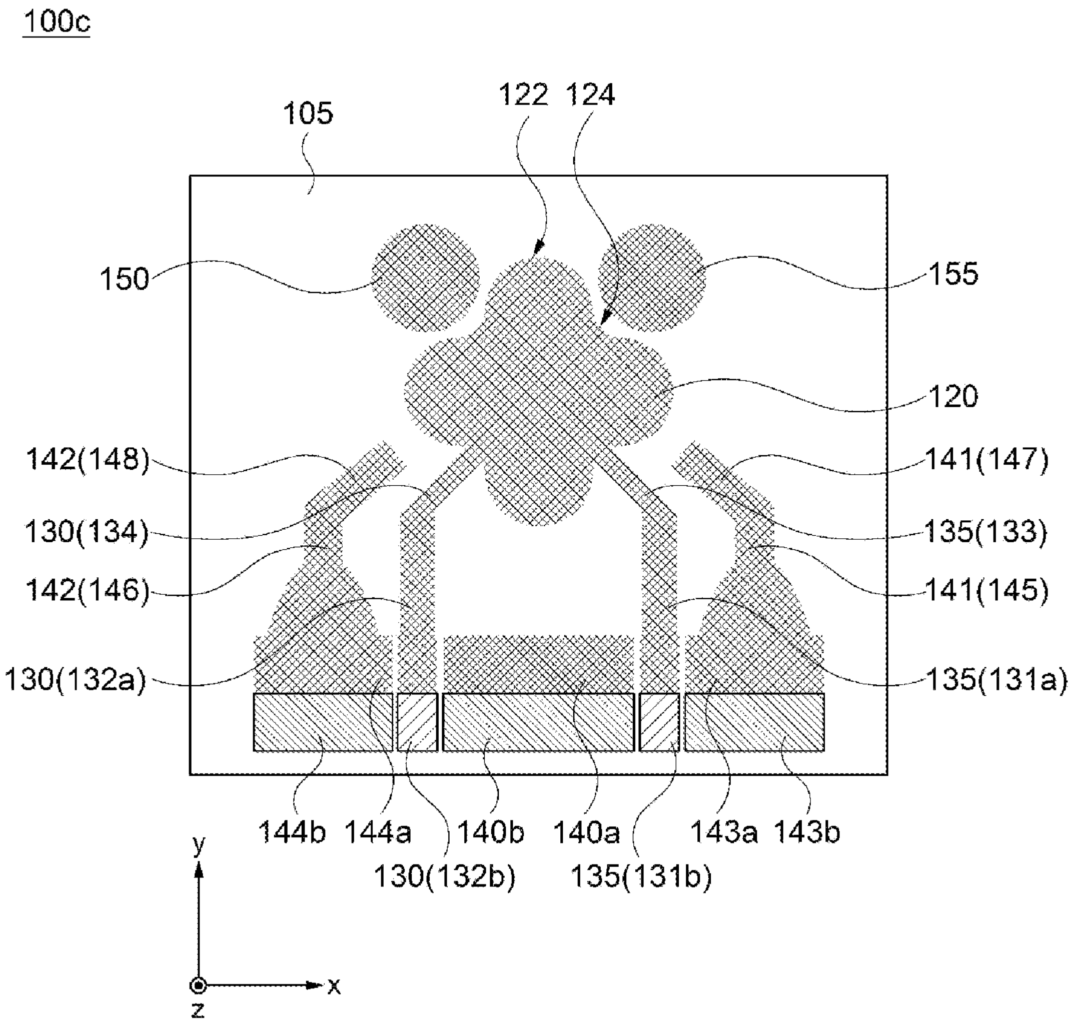

FIGS. 3 and 4 are schematic plan views illustrating antenna structures in accordance with exemplary embodiments. The antenna structures 100*b* and 100*c* of FIGS. 3 and 4 may be exemplary implementations of the antenna structure 100 of FIG. 1. Detailed descriptions on elements and structures substantially the same as or similar to those described with reference to FIGS. 1 and 2 are be omitted herein.

Referring to FIG. 3, the antenna conductive layer 110 may include a mesh structure. In exemplary embodiments, the radiator 120 and the upper parasitic elements 150 and 155 may entirely include a mesh structure, and the transmission lines 130 and 135 and the lower parasitic elements 140, 141 and 142 may partially include a mesh structure.

For example, the central parasitic element 140 and the parasitic bodies 143 and 144 of the side parasitic elements 141 and 142 may include a solid structure. The feeding portions 131 and 132 of the transmission lines 130 and 135 may partially include a mesh structure.

In an embodiment, the first feeding portion 132 may include a first mesh portion 132*a* and a first solid portion 132*b*. The second feeding portion 131 may include a second mesh portion 131*a* and a second solid portion 131*b*.

The first solid portion 132*b* may be interposed between the central parasitic element 140 and the first parasitic body 144 having the solid structure. The second solid portion 131*b* may be interposed between the central parasitic element 140 and the second parasitic body 143 having the solid structure.

A remaining portion of the side parasitic element 141 and 142 except for the parasitic body 143 and 144 may have the mesh structure, and a remaining portion of the transmission line 130 and 135 except for the solid portion 131*b* and 132*b* may have the mesh structure.

In an embodiment, portions of the antenna conductive layer 110 having the mesh structure may be disposed in a display area of an image display device. Accordingly, transmittance through the antenna conductive layer 110 may be improved to prevent degradation of an image quality of the image display device.

In an embodiment, a dummy mesh pattern (not illustrated) may be formed around portions of the antenna conductive layer 110 disposed in the display area. In this case, a pattern structure may become uniform to prevent the antenna conductive layer 110 from being visually recognized by a user.

In an embodiment, portions of the antenna conductive layer 110 having the solid structure may be disposed in a light-shielding area or a bezel area of the image display device. Accordingly, feeding efficiency may be improved by using a low-resistance solid metal layer and formation of the multiple-band may be promoted from the lower parasitic elements 140, 141 and 142.

Referring to FIG. 4, the central parasitic element 140 and the parasitic bodies 143 and 144 may also partially include the mesh structure.

The central parasitic element 140 may include a mesh element portion 140*a* and a solid element portion 140*b*. The first parasitic body 144 may include a first mesh body 144*a* and a first solid body 144*b*. The second parasitic body 143 may include a second mesh body 143*a* and a second solid body 143*b*.

A length of a mesh portion may also be extended in the feeding portions 131 and 132 of the transmission lines 130 and 135. For example, a first mesh portion 132*a* may be disposed between the first mesh body 144*a* and the mesh element portion 140*a*. A second mesh portion 131*a* may be disposed between the second mesh body 143*a* and the mesh element portion 140*a*.

For example, as the bezel area is reduced and the display area of the image display device is expanded, the central parasitic element 140 and the parasitic bodies 143 and 144 may also partially include the mesh structure to improve optical properties.

Figure 5:
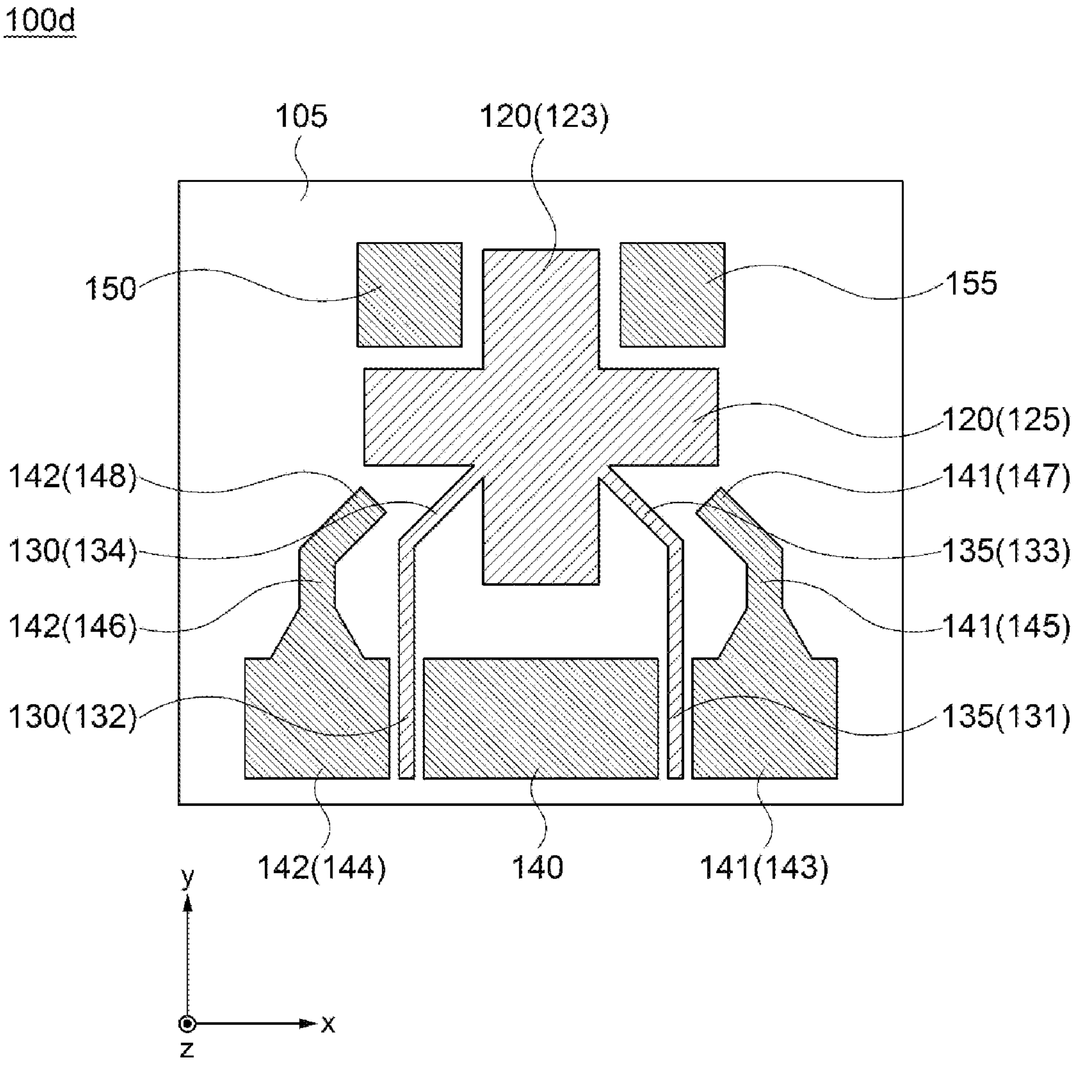
FIGS. 5 and 6 are schematic plan views illustrating antenna structures in accordance with exemplary embodiments.
Figure 6:
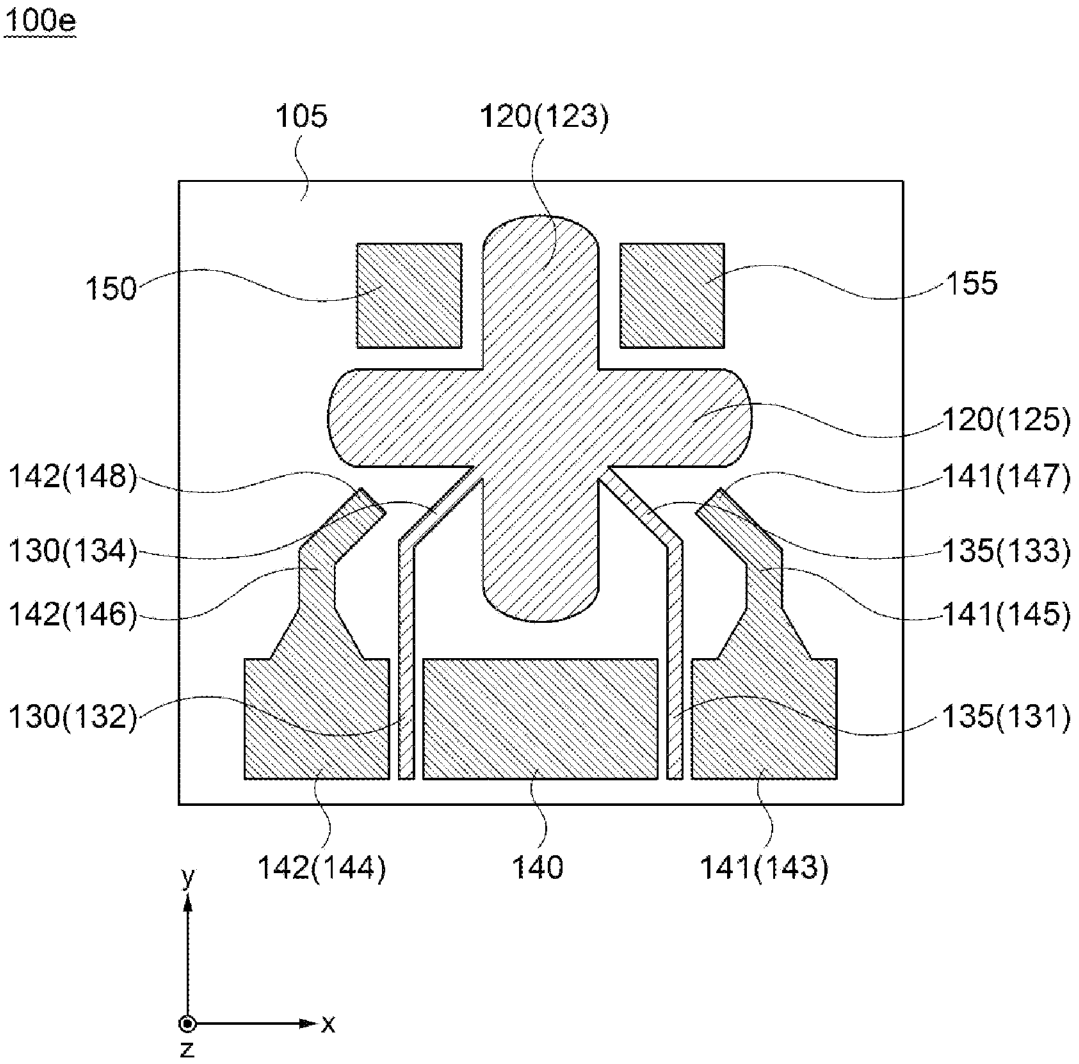

FIGS. 5 and 6 are schematic plan views illustrating antenna structures in accordance with exemplary embodiments. The antenna structures 100*d* and 100*e* of FIGS. 5 and 6 may be exemplary implementations of the antenna structure 100 of FIG. 1. Detailed descriptions on elements and structures substantially the same as or similar to those described with reference to FIGS. 1 and 2 are omitted herein.

Referring to FIG. 5, the radiator 120 may have a cross shape. For example, the radiator 120 may include a first radiation bar 123 and a second radiation bar 125 extending in directions perpendicular to each other and crossing each other. For example, the first radiation bar 123 may extend in the y-direction, and the second radiation bar 125 may extend in the x-direction.

Protrusions may be defined by the radiation bars 123 and 125, and a concave portion may be defined by a space between the radiation bars 123 and 125. The upper parasitic elements 150 and 155 may be disposed to be adjacent to the concave portions included in the upper portion of the radiator 120.

Referring to FIG. 6, end portions of the first radiation bar 123 and the second radiation bar 125 may each have a curved shape.

As described above, the shape of the radiator 120 may be properly modified in consideration of radiation efficiency and multi-band generation efficiency, and may not be limited as that in illustrated in FIGS. 2 to 6.

Figure 7:
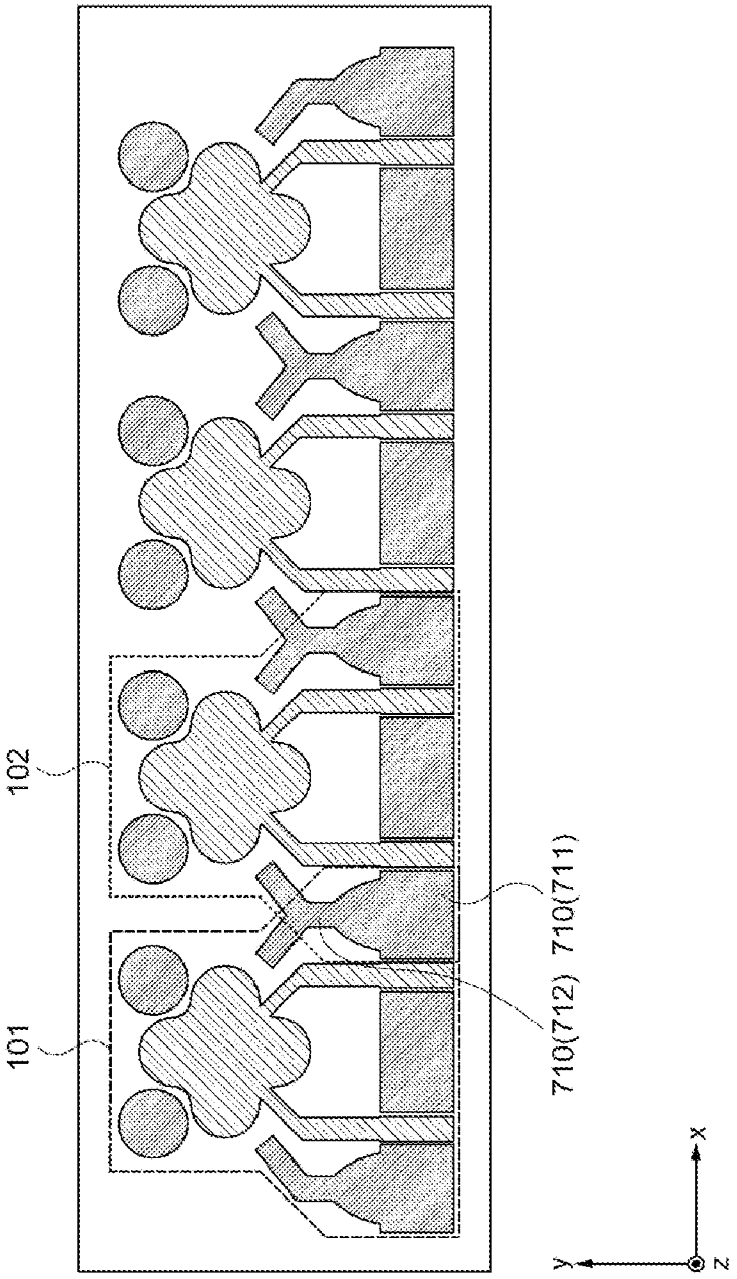
FIGS. 7 and 8 are schematic plan views illustrating antenna structures in accordance with exemplary embodiments.
Figure 8:
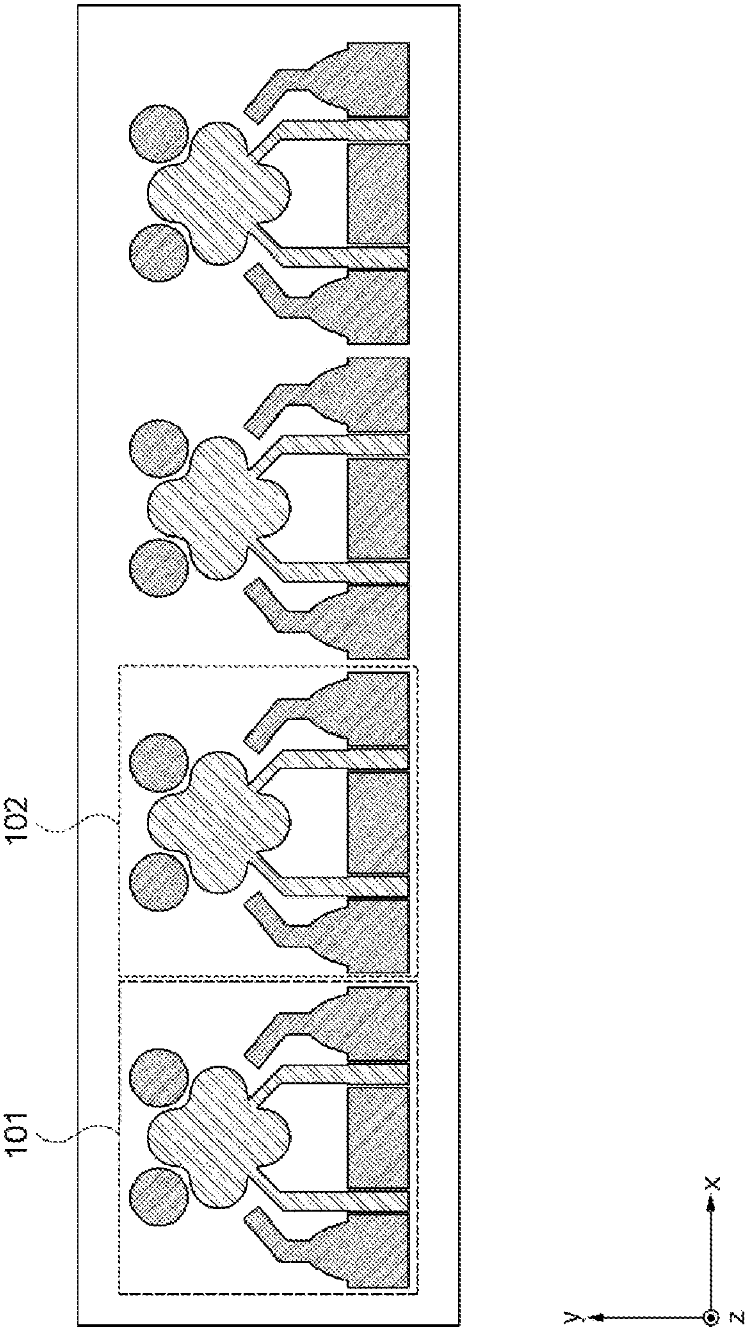

FIGS. 7 and 8 are schematic plan views illustrating antenna structures in accordance with exemplary embodiments. The antenna structure of FIGS. 7 and 8 may be exemplary implementations of the antenna structure 100 of FIG. 1.

An antenna unit of may be defined by one radiator 120, transmission lines 130 and 135 connected or coupled to the one radiator 120, and parasitic elements 140, 141, 142, 150 and 155 as described with reference to FIGS. 2 to 6. The antenna unit may serve as an independent radiation unit operated or driven in a high-frequency or ultra-high frequency band of 3G or higher as described above.

Referring to FIG. 7, an antenna structure according to exemplary embodiments may include a plurality of antenna units 101 and 102. Neighboring antenna units 101 and 102 may share at least a portion of each other in common, and may be arranged in a width direction (the x-direction) to form an antenna unit array.

In exemplary embodiments, the neighboring antenna units 101 and 102 may share a portion of one side parasitic element 710 with each other. For example, as illustrated in FIG. 7, the neighboring antenna units 101 and 102 may share the parasitic body 711 and the parasitic extension 712 of the side parasitic element 710 with each other.

The parasitic body 711 and the parasitic extension 712 shared by the neighboring antenna units 101 and 102 may include the second parasitic body 143 (see FIG. 2) and the second parasitic extension 145 (see FIG. 2) of the first antenna unit 101 and, and may also include the first parasitic body 144 (see FIG. 2) and the first parasitic extension 146 (see FIG. 2) of the second antenna unit 102.

In exemplary embodiments, the parasitic body 711 and the parasitic extension 712 may serve as the second parasitic body 143 (see FIG. 2) and the second parasitic extension 145 (see FIG. 2) of the first antenna unit 101, and may also serve as the first parasitic body 144 (see FIG. 2) and the first parasitic extension 146 (see FIG. 2) of the second antenna unit 102.

Referring to FIG. 8, an antenna structure according to exemplary embodiments may include a plurality of antenna units 101 and 102. The plurality of antenna units 101 and 102 may be arranged to be spaced apart from each other in the width direction (the x-direction) to form an antenna unit array.

A spacing distance between the neighboring antenna units 101 and 102 may be appropriately adjusted within a range in which an undesired coupling between the neighboring antenna units 101 and 102 may be avoided or prevented.

As described above, a first feeding signal and a second feeding signal having different phases may be applied to each of the antenna units 101 and 102. For example, the first feeding signal and the second feeding signal having a phase difference from about 120° to 200°, preferably from 120° to 180°, more preferably of 180° may be applied to each antenna unit.

In exemplary embodiments, the phase difference between the first feeding signal and the second feeding signal applied to each of the antenna units 101 and 102 may be substantially the same. For example, if the first feeding signal and the second feeding signal having a specific phase difference are applied to the first antenna unit 101, the first feeding signal and the second feeding signal having the specific phase difference may also be applied to the second antenna unit 102.

In exemplary embodiments, feeding signals of different phases may be applied to each of the antenna units 101 and 102 to form a beam pattern in a desired radiation direction. The phase difference between the first feeding signal and the second feeding signal applied to each of the antenna units 101 and 102 may be maintained, and a phase difference may be provided between the antenna units 101 and 102, so that the beam pattern in a desired direction may be formed.

For example, a first feeding signal having a phase of 0° and a second feeding signal having a phase of 180° may be applied to the first antenna unit 101, and a first feeding signal having a phase of m and a second feeding signal having a phase of m+180° may be applied to the second antenna unit 102.

Figure 9:
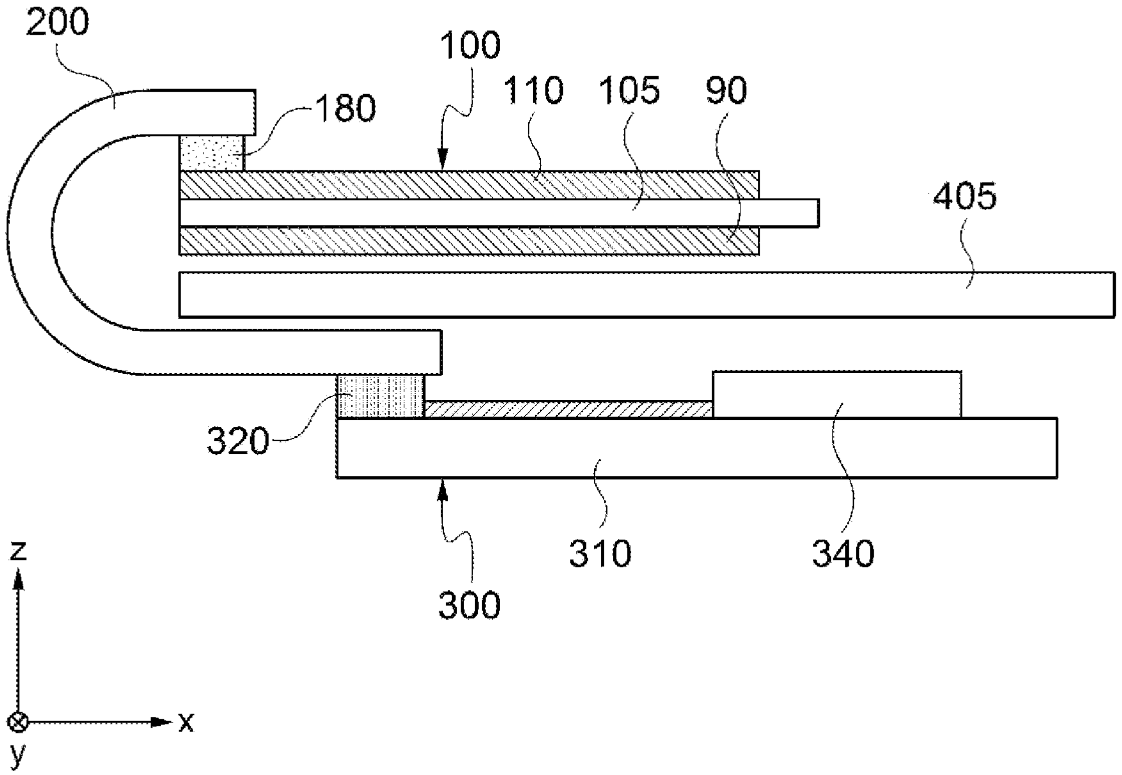
FIG. 9 is a schematic cross-sectional view illustrating an antenna package and an image display device in accordance with exemplary embodiments.
Figure 11:
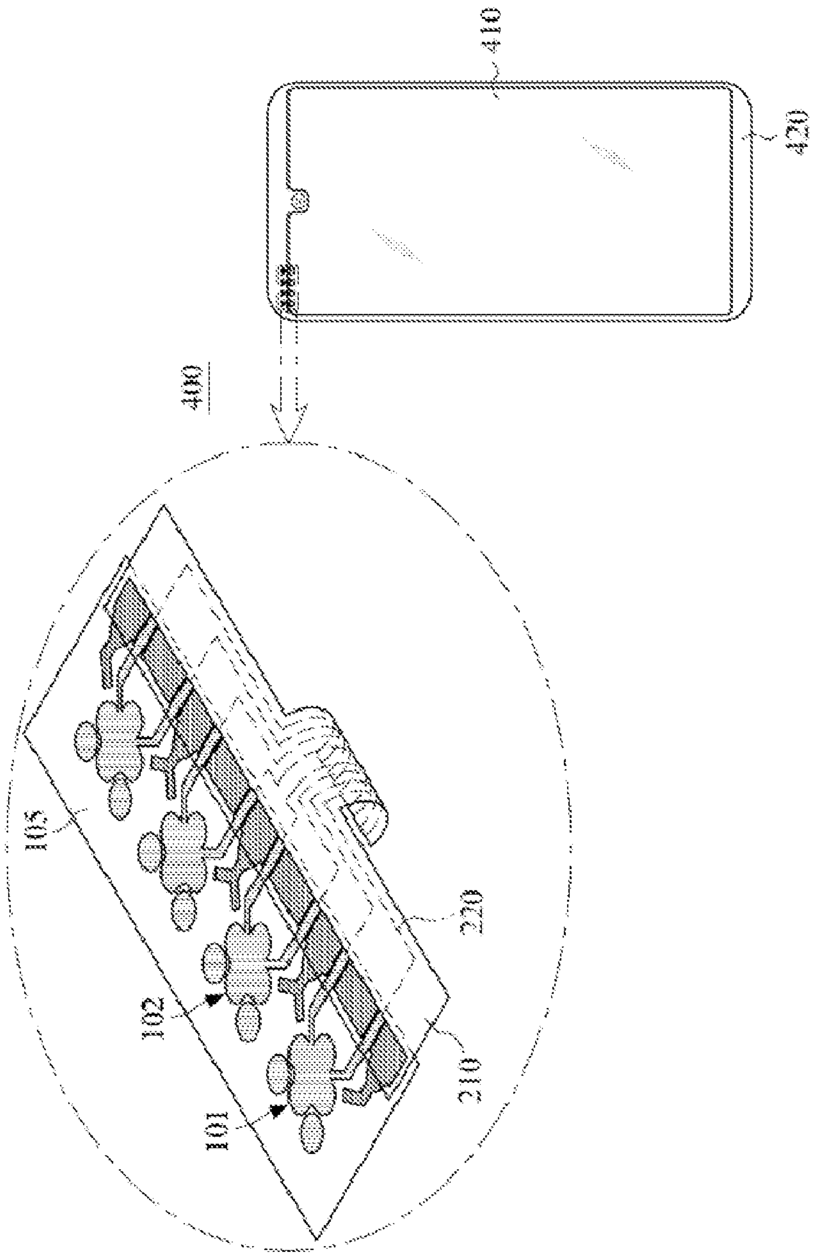
FIG. 11 is a schematic plan view for describing an image display device in accordance with example embodiments.

FIG. 9 is a schematic cross-sectional view illustrating an antenna package and an image display device in accordance with exemplary embodiments. FIG. 10 is a schematic partially enlarged plan view for describing an antenna package in accordance with exemplary embodiments. FIG. 11 is a schematic plan view for describing an image display device in accordance with example embodiments.

Referring to FIGS. 9 to 11, an image display device 400 may be fabricated in the form of, e.g., a smart phone, and FIG. 11 illustrates a front portion or a window surface of the image display device 400. The front portion of the image display device 400 may include a display area 410 and a peripheral area 420. The peripheral area 420 may correspond to, e.g., a light-shielding portion or a bezel portion of the image display device.

The above-described antenna structure 100 may be combined with an intermediate circuit board 200 to form an antenna package. The antenna structure 100 included in the antenna package may be disposed toward the front portion of the image display device 400. For example, the antenna structure 100 may be disposed on a display panel 405. The radiator 120 may be disposed on the display area 410 in a plan view.

In this case, the radiator 120 may include the mesh structure, and a reduction of transmittance due to the radiator 120 may be prevented. The lower parasitic elements and the feeding portions included in the antenna structure 100 may include a solid metal pattern, and may be disposed on the peripheral region 420 to prevent a degradation of an image quality.

In some embodiments, the intermediate circuit board 200 may be bent to be disposed at a rear portion of the image display device 400 and extend toward a chip mounting board 300 on which an antenna driving IC chip 340 is mounted.

The intermediate circuit board 200 and the chip mounting board 300 may be coupled to each other by a connector 320 to be included in the antenna package. The connector 320 and the antenna driving IC chip 340 may be electrically connected via a connection circuit 310.

For example, the intermediate circuit board 200 may be a flexible printed circuit board (FPCB). The chip mounting board 300 may be a rigid printed circuit board (Rigid PCB).

As illustrated in FIG. 10, the intermediate circuit board 200 may include a core layer 210 including a flexible resin and feeding lines 220 formed on the core layer 210. Each of the feeding lines 220 may be attached and electrically connected to the first feeding portion 132 and the second feeding portion 131 by a conductive intermediate structure 180 (see FIG. 9) such as an anisotropic conductive film (ACF).

Terminal ends of the first feeding portion 132 and the second feeding portion 131 bonded to the feeding lines 220 may serve as a first antenna port and a second antenna port, respectively. A feeding signal may be applied from the antenna driving IC chip 340 through the first antenna port and the second antenna port.

As described above, the feeding signal having a phase difference (e.g., 120°~180° phase difference) may be applied to the radiator 120 through the first antenna port and the second antenna port to implement the multi-band antenna.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Experimental Example

As illustrated in FIG. 7, four antenna units were arranged such that neighboring antenna units shared a portion of one side parasitic element with each other to fabricate an antenna structures.

Feeding signals having a phase difference as shown in Table 1 below were applied to a first antenna port (Port 1) and a second antenna port (Port 2), and a return loss and an antenna gain were measured according to the phase difference were measured. The results are shown in FIGS. 12 and 13

Figure 12:
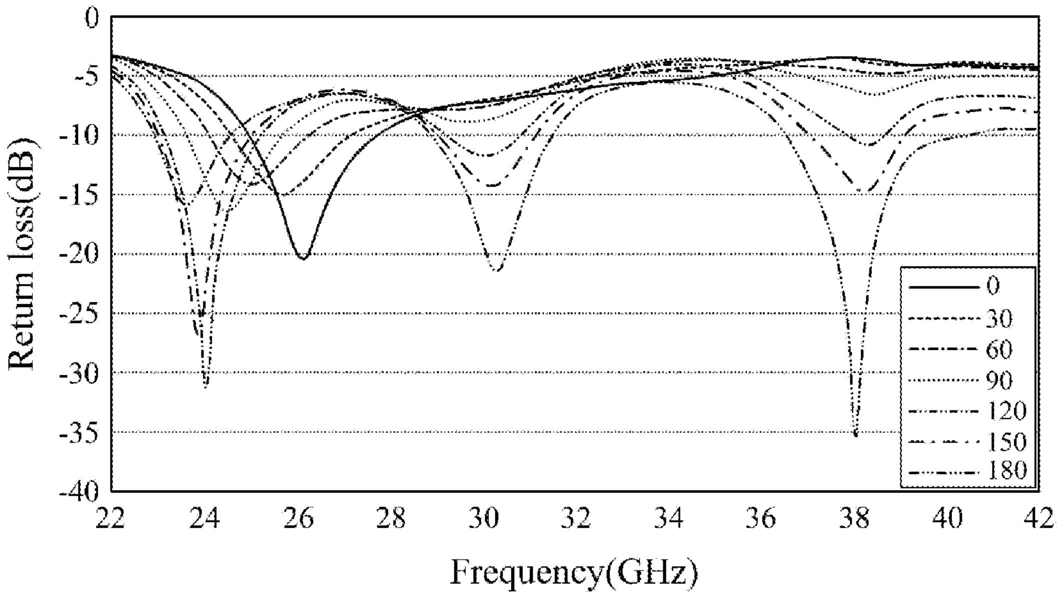
FIG. 12 is a graph showing a return loss depending on a phase difference of feeding signals according to Example.
Figure 12:
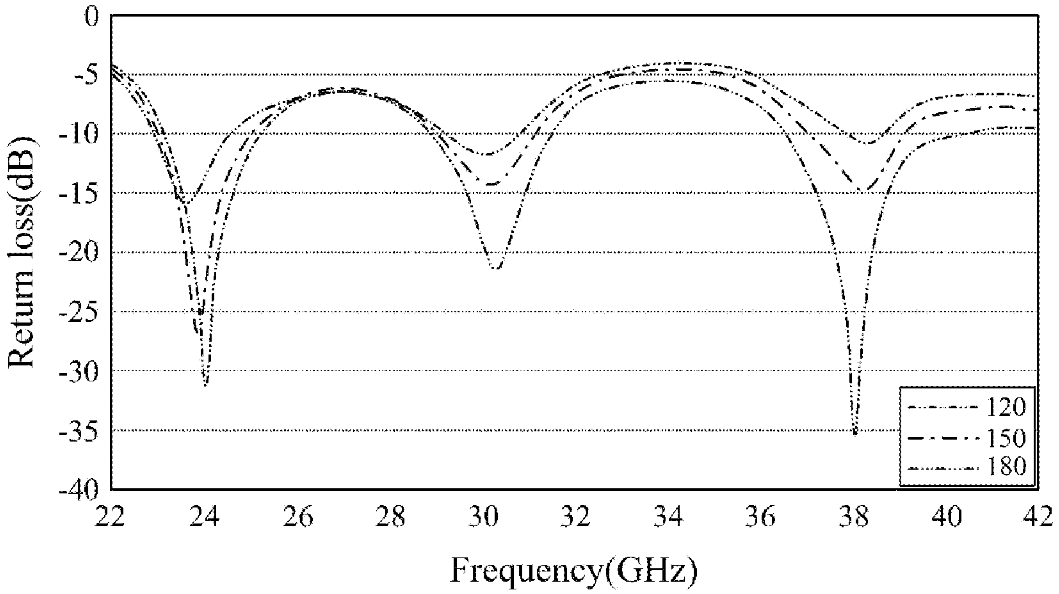
Figure 13:
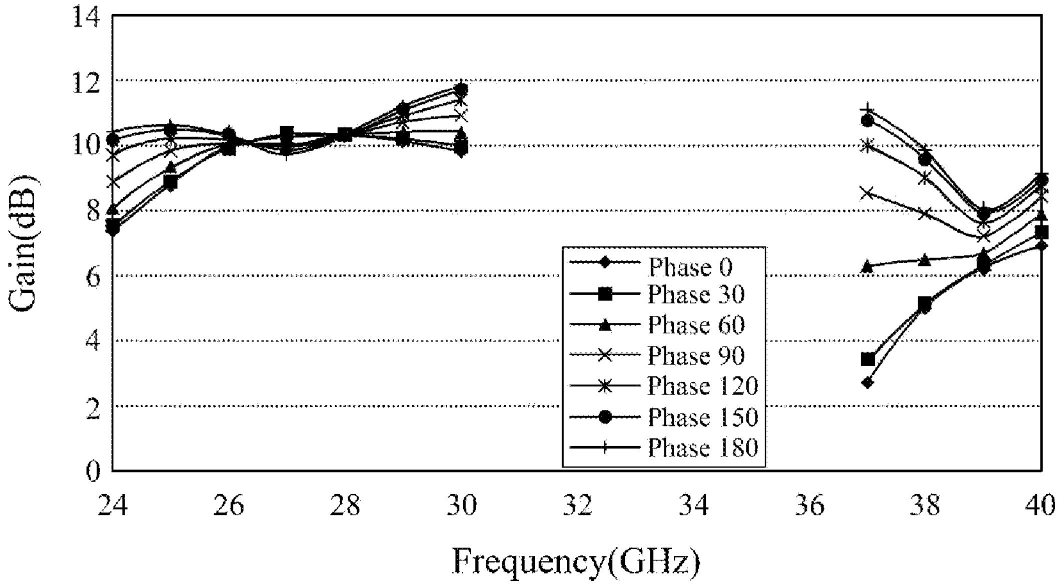
FIG. 13 is a graph showing an antenna gain depending on a phase difference of feeding signals according to Example.
Figure 13:
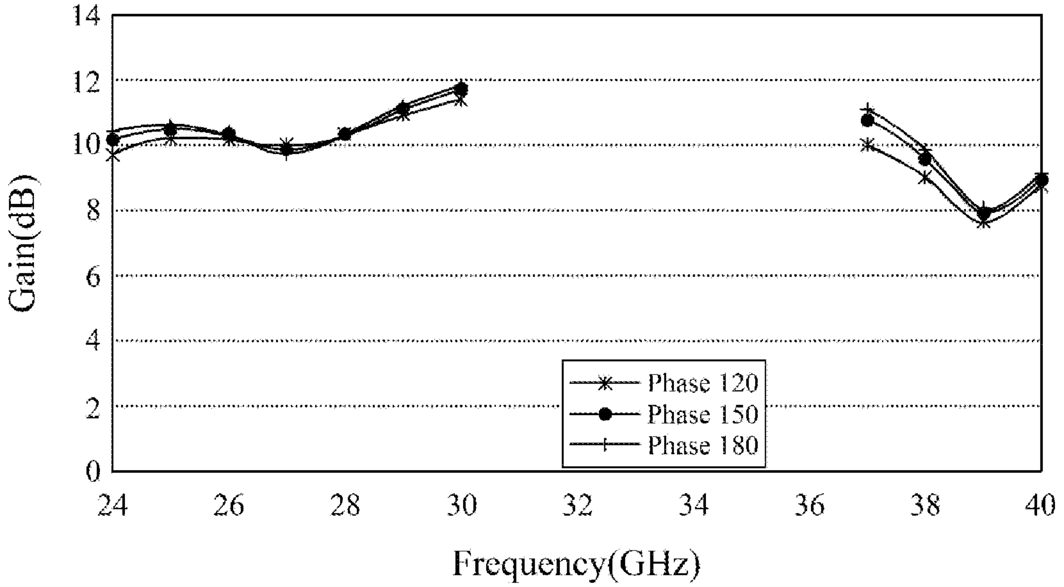

The results of measuring the return loss and antenna gain according to the phase difference by applying a feed signal having a different phase difference as shown in Table 1 to the first antenna port (Port 1) and the second antenna port (Port 2) of each antenna unit are shown in FIGS. 12 and 13 could be obtained.

TABLE 1

| Case No. | Port 1 | Port 2 |
|---|---|---|
| 1 | 0° | 0° |
| 2 | 0° | 30° |
| 3 | 0° | 60° |
| 4 | 0° | 90° |
| 5 | 0° | 120° |
| 6 | 0° | 150° |
| 7 | 0° | 180° |

FIG. 12 includes a graph (a) showing return loss results of Cases 1-7, and a graph (b) showing the return loss results of Cases 5-7 extracted from the graph (a). FIG. 13 includes a graph (a) showing antenna gain results of Cases 1-7, and a graph (b) showing the antenna gain results of Cases 5-7 extracted from the graph (a).

Referring to FIGS. 12 and 13, generation of a triple band antenna was achieved by adjusting the phase difference applied to the first antenna port (Port 1) and the second antenna port (Port 2) of each antenna unit.

Specifically, in Case 5 with the phase difference of 120°, Case 6 with the phase difference of 150° and Case 6 with the phase difference of 180°, three frequency bands with the return loss of −10 dB or less were be obtained, and the high-level antenna gains were achieved.

What is claimed is:

1. An antenna structure, comprising:
a dielectric layer; and
a plurality of antenna units arranged on a top surface of the dielectric layer, each of the plurality of antenna units comprising:
a radiator;
a transmission line comprising a first transmission line and a second transmission line that extend in different directions being connected to the radiator;
an upper parasitic element adjacent to an upper portion of the radiator; and
a lower parasitic element adjacent to a lower portion of the radiator and the transmission line,
wherein the first transmission line having a first feeding portion, and the second transmission line having a second feeding portion, where the first feeding portion and the second feeding portion serve as antenna ports to which feeding signals of different phases are applied, and the feeding signals of different phases are applied to the first transmission line and the second transmission line.

2. The antenna structure of claim 1, wherein a phase difference between the feeding signals applied to the first transmission line and the second transmission line is from 120° to 180°.

3. The antenna structure of claim 1, wherein at least a portion of an antenna unit of the plurality of antenna units is shared with another neighboring antenna unit.

4. The antenna structure of claim 3, wherein the antenna unit and the neighboring antenna unit share a portion of the lower parasitic element with each other.

5. The antenna structure of claim 1, wherein the plurality of antenna units are arranged being spaced apart from each other.

6. The antenna structure of claim 1, wherein the radiator comprises convex portions and concave portions; and
the first transmission line and the second transmission line are connected to different concave portions among the concave portions.

7. The antenna structure of claim 1, wherein the first transmission line further comprises a first bent portion extending from the first feeding portion being connected to the radiator, and the second transmission line further comprises a second bent portion extending from the second feeding portion being connected to the radiator.

8. The antenna structure of claim 1, wherein the upper parasitic element comprises a first upper parasitic element and a second upper parasitic element separated from each other.

9. The antenna structure of claim 8, the radiator comprises convex portions and concave portions, and the first upper parasitic element and the second upper parasitic element are disposed being adjacent to different concave portions of the concave portions.

10. The antenna structure of claim 9, wherein the first upper parasitic element and the second upper parasitic element face each other with a convex portion located at an upper portion of the radiator among the convex portions interposed therebetween.

11. The antenna structure of claim 1, wherein the lower parasitic element comprises:

a first side parasitic element adjacent to the first transmission line; and a second side parasitic element adjacent to the second transmission line.

12. The antenna structure of claim 11, wherein the lower parasitic element further comprises a central parasitic element disposed between the first transmission line and the second transmission line; and the first side parasitic element is separated from the central parasitic element with the first transmission line interposed therebetween, and the second side parasitic element is separated from the central parasitic element with the second transmission line interposed therebetween.

13. The antenna structure of claim 12, wherein the first side parasitic element comprises:

a first parasitic body facing the central parasitic element with the first transmission line interposed therebetween;

a first parasitic extension protruding from the first parasitic body; and a first parasitic branched portion extending from the first parasitic extension toward the radiator, wherein the second side parasitic element comprises:

a second parasitic body facing the central parasitic element with the second transmission line interposed therebetween;

a second parasitic extension protruding from the second parasitic body; and a second parasitic branched portion extending from the second parasitic extension toward the radiator.

14. The antenna structure of claim 13, wherein the radiator has a mesh structure; and the central parasitic element, the first parasitic body, and the second parasitic body have a solid structure.

15. The antenna structure of claim 14, wherein a portion of the first transmission line between the central parasitic element and the first parasitic body has a solid structure, and a remaining portion of the first transmission line has a mesh structure; and a portion of the second transmission line between the central parasitic element and the second parasitic body has a solid structure, and a remaining portion of the second transmission line has a mesh structure.

16. The antenna structure of claim 13, wherein the radiator has a mesh structure; and each of the central parasitic element, the first parasitic body and the second parasitic body comprises a mesh portion and a solid portion.

17. The antenna structure of claim 1, wherein the radiator has a four-leaf clover shape or a cross shape.

18. An image display device comprising the antenna structure of claim 1.

* * * * *